United States Patent

[11] 3,628,772

[72] Inventors Gilbert W. Gaarder;
 Elmont E. Hollingsworth, both of Saint Joseph, Mo.
[21] Appl. No. 828,071
[22] Filed May 1, 1969
[45] Patented Dec. 21, 1971
[73] Assignee Gray Manufacturing Company, Inc.
 Saint Joseph, Mo.

[54] LOAD-CARRYING AND POSITIONING HEAD
 4 Claims, 5 Drawing Figs.
[52] U.S. Cl. .................................................. 254/134
[51] Int. Cl. .................................................. B66f 3/00
[50] Field of Search .................................... 254/8, 9, 133, 134; 214/1 D

[56] References Cited
 UNITED STATES PATENTS
 2,747,837  5/1956  Turner ........................ 254/134
 2,838,278  6/1938  Johnsen ...................... 254/134

Primary Examiner—Andrew R. Juhasz
Assistant Examiner—David R. Melton
Attorney—Schmidt, Johnson, Hovey & Williams ABSTRACT: A load-carrying and positioning head for use in connection with jacks for handling vehicle transmissions or similar load lifting and handling devices, the head having a platform upon which the load rests, there being a plurality of arms carried by the platform and shiftable with respect thereto and into clamping engagement with the load when it is on the platform, there being chains cooperable with the platform for retaining the load thereon when the platform is tilted. The platform is carried by a mount which is coupled to the jack or the like, and is shiftable into plurality positions, there being a vertical axis coupling the mount and the platform whereby the platform may be rotated about a vertical axis with respect to the mount; there being a leveling link coupled with the mount, the mount having a transverse axis whereby the platform may be rotated about a horizontal axis; and there being a plate having a spherical surface carried by the platform and mating with a dished member, there being means for shifting the plate whereby the platform may be tilted from side to side.

PATENTED DEC 21 1971 3,628,772
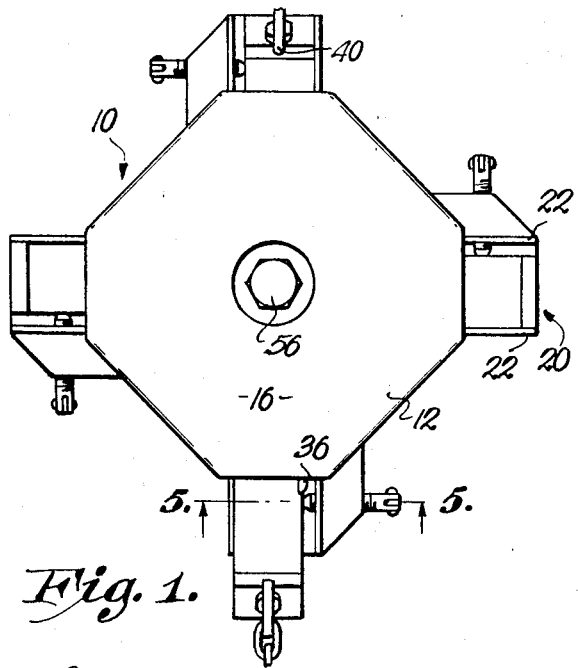
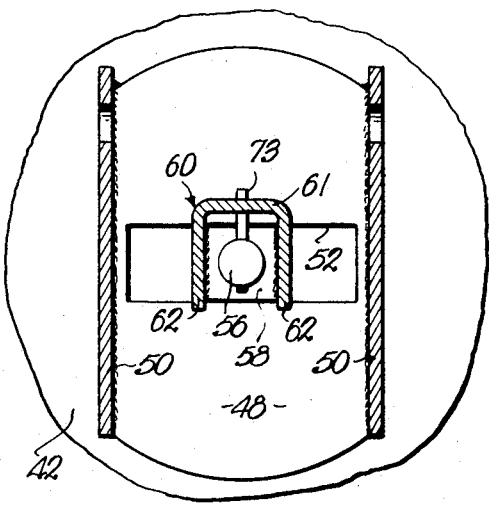
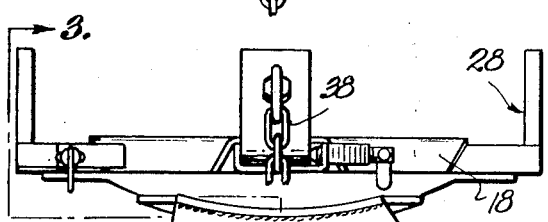
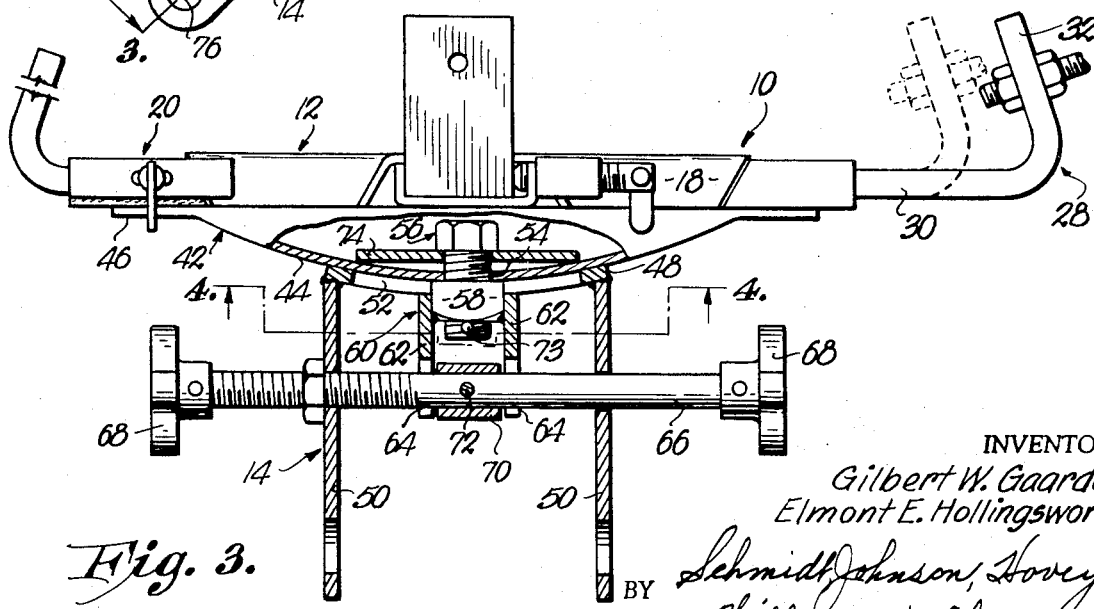
INVENTORS
Gilbert W. Gaarder
Elmont E. Hollingsworth
BY Schmidt, Johnson, Hovey,
Williams & Chase
ATTORNEYS

LOAD-CARRYING AND POSITIONING HEAD

It is the most important object of this invention to provide a load-carrying and positioning head which is particularly intended for use in connection with a jack for handling automobile transmissions or similar supporting and lifting devices wherein it is desired to shift the load carried by the head in order to position the same with respect to means to which it is to be attached, inserted or the like.

Accordingly, it is the primary object of this invention to provide a load-carrying and positioning head which includes a platform upon which the load rests, the platform having a plurality of arms shiftably carried thereby, each arm having a first stretch in the same plane as the platform and a second stretch in a laterally extending plane, each of the arms being independently shiftable with respect to the platform and lockable in a fixed position whereby said arms may be utilized to clamp the load with respect to the head when it is resting on the platform.

Yet another important object is to provide a load-carrying and receiving head which is shiftable in several various planes, all to the end that the load thereupon may be positioned as, for example, when it is desired to remove or replace a transmission in a vehicle. There are means provided for permitting such shifting movement of the head in the form of a mount which couples the head with its supporting apparatus such as a transmission jack for example, the mount carrying a dished member which complementally receives a spherical plate which is carried beneath the platform, there being means for shifting the plate with respect to the member whereby to tilt the platform of the head from side to side with respect to the mount.

Yet another significant object is the provision of a mount for carrying the head, which mount is coupled with a leveling assembly whereby, upon actuation of said assembly, the mount is rotated about a transverse, horizontal axis to move the platform of the head in a fore-and-aft direction with respect to its supporting apparatus.

Another important aim is to provide means for mounting the platform on the mount whereby the platform may be rotated about the vertical axis with respect to the mount.

Other objects include details of construction which will become apparent from the following specification and accompanying drawing, wherein:

FIG. 1 is a top plan view of the load-carrying and positioning head;
FIG. 2 is a side elevational view thereof;
FIG. 3 is a sectional view taken along line 3–3 of FIG. 2;
FIG. 4 is a sectional view taken along line 4–4 of FIG. 3; and
FIG. 5 is a sectional view taken along line 5–5 of FIG. 1.

The load-carrying and positioning head 10 includes a platform 12 which is intended to at least partially support the load and which is normally disposed in a substantially horizontal plane. The platform 12 is carried by a mount 14, which mount 14 is suitably coupled with supporting apparatus such as a jack or the like whereby the entire combination unit may be utilized to handle a vehicle transmission or a similar heavy, bulky piece which is to be moved about and precisely positioned.

The platform 12 has an upper surface 16 and a generally circumscribing skirt 18, the skirt 18 being broken at four intervals in the embodiment chosen for illustration whereby to present a plurality of outwardly extending channels 20, each having a pair of upstanding sidewalls 22 in opposed parallel relationship, and a screw clamp assembly 24 carried by one of said sidewalls 22. The screw clamp assembly includes a locking member 26 which is rotatable with respect to the assembly whereby to move the same in and out with respect to the channel 20.

Each of the channels 20 carries a generally L-shaped arm 28, said arms each including a first stretch 30 which is in essentially the same plane as the platform 12, and a second stretch 32 integral with the first stretch and in a plane extending laterally with respect to that of the first stretch and that of the platform.

The first stretches 30 of each of the arms 28 are slidably received within corresponding channels 20 whereby said arms 28 may be shifted toward and away from the platform in a linear path. Once the arms have been shifted to the desired position whereby to clamp the load with respect to the platform 12, the locking members 26 are rotated toward the first stretches 30 whereby to clamp the same in position by holding the stretch 30 between the tip 34 of the locking member and the opposed sidewall 22 of channel 20. In order to prevent the arm 28 from being removed from their corresponding channels 20, each of the arms has a lug 36 formed on the first stretch thereof, the stop lugs moving into engagement with the tip 34 of the locking members 26 when the arms 28 are moved outwardly with respect to the platform 12, thereby precluding removal of the arms from the channels unless locking members 26 are loosened several turns whereby to permit lug 36 to pass tip 34.

If desired, a chain such as 38, may be secured to selected second stretches 32 and eyebolts such as 40 secured to opposed second stretches 32 whereby the chains 38 may be wrapped over the load when it is positioned on platform 12 to thereby secure the same against shifting movement when the platform is tilted in a manner hereinafter described.

In order to permit shifting movement of the platform 12 in virtually any plane, the same is coupled with mount 14 through a plate 42 having a spherical surface 44, the plate 42 having its peripheral edges 46 suitably secured to the undersurface of the platform 12.

A dished member 48 is carried by the plates 50 which are a part of the mount 14, and member 48 complementally receives the spherical surface 44 of plate 42, the dished member 48 being of an arcuate configuration complementary to that of spherical surface 44.

A slot 52 is formed centrally of the dished member 48 and underlies an aperture 54 which is substantially central of plate 42 whereby to permit passage of a vertically positioned bolt 56 through said aperture 54 and slot 52 whereby the nut 58 carried by the bolt may be secured to a bracket 60 as by welding or the like, all as is clearly shown in FIG. 3 of the drawing.

The U-shaped bracket 60 includes a bight 61 and a pair of spaced-apart arms 62, each arm 62 having an aperture 64 in the lowermost end thereof, there being a threaded shaft 66 extending through said aligned apertures 64 and being journaled in the oppositely disposed plates 50. Knobs such as 68 are secured to each end of the threaded shaft 66 whereby the same may be rotated to thereby rotate a spacer 70 which is disposed between the arms 62 and essentially between apertures 64 therein, the spacer 70 being secured to shaft 66 as by a pin 72 whereby said spacer 70 rotates with said shaft 66. The lower end of bolt 56 is secured with respect to bight 61 by a locking pin 73 and the upper end of bolt 56 carries a clamp 74, the bolt 56 and clamp 74 being utilized to clamp the plate 42 and member 48 together, thereby preventing free relative rotation or side-to-side tilt.

The lower ends of opposed plates 50 and, therefore, mount 14, are connected with a leveling link assembly (not shown) as by a pin 76, the leveling link assembly exerting a push or pull force upon mount 14 through pin 76, all to the end that the mount 14 may be rotated about a transversely positioned lift arm connecting pin 78 to thereby rotate the head 10 in a fore-and-aft direction about a transverse, horizontal axis defined by pin 78.

When it is desired to tilt head 10, and more particularly platform 12 in a side-to-side direction with respect to mount 14, one of the knobs 68 is actuated whereby to rotate shaft 66, thereby causing the shaft to move horizontally with respect to the plates 50, this motion also moving spacer 70 in a horizontal plane thereby transmitting the horizontal motion of the shaft 66 and spacer 70 through bracket 60 to bolt 56 and thence to plate 42, all to the end that plate 42 is shifted with respect to dished member 48, said shifting movement being in a side-to-side direction with respect to the mount 14, the particular direction of side-to-side movement depending upon the direction of rotation of the threaded shaft 66.

Furthermore, when it is desired to rotate the platform 12 and thereby the load carried on said platform without the necessity of rotating the entire supporting apparatus, this may be accomplished through relative rotation of the plate 42 with respect to the dished member 48 about the vertical axis defined by bolt 56. The bracket 60 and pin 73 retain the bolt 56 with respect to plate 42 and by exerting a force in a horizontal plane upon the platform 12 or one of the arms 28 the platform may be rotated about the axis of bolt 56.

Thus there is presented a load-carrying and receiving head which is shiftable in a plurality of planes, all to the end that the load carried by the platform may be precisely positioned as is necessary, for instance, when a transmission is to be removed from or replaced in a vehicle. Through utilization of the leveling link connection 76, the entire head may be rotated in a fore-and-aft tilting direction about pin 78; the platform may be shifted in a side-to-side rolling direction through utilization of shaft 66, or additionally, the platform may be rotated in a complete 360° circle about the vertical axis of bolt 56.

Having thus described the invention, what is claimed as new and desired to be secured by Letters Patent is:

1. A load-carrying and positioning head comprising:
   a platform for receiving said load;
   a plurality of arms shiftably carried by said platform, said arms each having a first stretch in the same plane as said platform and a second stretch in a laterally extending plane;
   means for locking said arms in a selected position with respect to said platform, said means including a locking device for said arms and engageable with the first stretch thereof; and
   means extending horizontally outwardly from the platform for supportingly receiving the first stretches and restricting shifting movement of said stretches toward and away from said platform to a substantially linear path.

2. A load-carrying and positioning head as set forth in claim 1, said locking device being carried by said outwardly extending means.

3. A load-carrying and positioning head for use with a lifting device comprising:
   a platform for receiving said load;
   a mount for said platform; and
   a plate carried by said platform therebeneath, said plate having a substantially spherical surface, the center of said surface being above the platform, said mount including a dished member carried by the mount and complementally receiving said plate, said plate and said dished member being shiftable with respect to each other.

4. A load-carrying and positioning head for use with a lifting device comprising:
   a platform for receiving said load;
   a mount for said platform;
   a plate carried by said platform therebeneath, said plate having a substantially spherical surface, said mount including a dished member carried by the mount and complementally receiving said plate, said plate and said dished member being shiftable with respect to each other; and
   means for shifting said plate with respect to said dished member, said means including a shaft coupled with said plate, rotation of said shaft causing said platform to tilt from side to side with respect to said device.

* * * * *